United States Patent [19]
Takato et al.

[11] Patent Number: 5,335,271
[45] Date of Patent: Aug. 2, 1994

[54] RING TRIP DETECTION CIRCUIT

[75] Inventors: Kenji Takato; Kazumi Kinoshita; Kiyoshi Kurosaki; Taichi Kosako, all of Kawasaki; Kazuyuki Minohara, Yokohama, all of Japan

[73] Assignee: Fujitsu Limited, Kawasaki, Japan

[21] Appl. No.: 938,771

[22] Filed: Sep. 3, 1992

[30] Foreign Application Priority Data

Sep. 12, 1991 [JP] Japan .................. 3-232677

[51] Int. Cl.$^5$ ............................... H04M 3/02
[52] U.S. Cl. ................... 379/382; 379/377; 379/252; 379/251
[58] Field of Search ........... 379/382, 377, 252, 253, 379/254, 255

[56] References Cited

U.S. PATENT DOCUMENTS 4,356,355 10/1982 Ferrieu et al. .................. 379/382
4,827,505 5/1989 Takato et al. .................. 379/377 X
4,995,111 2/1991 Tojo et al. ....................... 379/382

Primary Examiner—James L. Dwyer
Assistant Examiner—Paul A. Fournier
Attorney, Agent, or Firm—Nikaido, Marmelstein, Murray & Oram

[57] ABSTRACT

A ring trip detection circuit detects an OFF-hooked state of a telephone receiver during ringing of a telephone set by detecting a change in a voltage across two terminals of a transmission resistor through which a ringing signal is supplied to the telephone set from a ringing signal source. The ring trip detection circuit includes a voltage dividing circuit coupled to the two terminals of the transmission resistor for dividing voltages at the two terminals and for outputting divided voltages, a pair of transistors having bases for respectively receiving the divided voltages from the voltage dividing circuit, a constant current source, a pair of resistors having first terminals respectively coupled to emitters of the pair of transistors and second terminals coupled in common to the constant current source, where the pair of resistors have the same resistance, and a current mirror circuit coupled to collectors of the pair of transistors for outputting an output current which indicates whether or not the telephone receiver is OFF-hooked.

12 Claims, 5 Drawing Sheets

RING TRIP DETECTION CIRCUIT

BACKGROUND OF THE INVENTION

The present invention generally relates to ring trip detection circuits, and more particularly to a ring trip detection circuit which makes a ring trip detection using a small number of parts.

A subscriber circuit which is provided for each subscriber in a switching system normally has the so-called BORSCHT functions. BORSCHT is an abbreviation for Battery feed, Overvoltage protection, Ringing, Supervision, Codec, Hybrid, and Test. Out of the BORSCHT functions, the R (Ringing) function includes a ringer transmitting function for transmitting a ringing (or call) signal and a ring trip function for cutting off the ringing signal if the subscriber OFF-hooks the telephone receiver during the ringing.

In order to realize the ring trip function, it is necessary to detect whether or not the subscriber OFF-hooks the telephone receiver during the ringing. For this detection, a ring trip detection circuit is provided. The ring trip detection circuit detects a change in a current which flows through a transmission resistor. It is desirable from the economical point of view that such a ring trip detection circuit is made up of a minimum number of parts.

FIG. 1 shows an example of a general subscriber circuit. This subscriber circuit includes a protection test part 12 which is coupled to a telephone set 11 and has the functions of protecting and testing a subscriber line, a relay 13 for switching, a battery feed and supervision part 14 which has the functions of supplying power and monitoring the subscriber line, a two-wire/four-wire switching part 15 which has the function of making a two-wire/four-wire switching, a codec (coder/decoder) part 16 which is coupled to a network 17 and has the functions of coding and decoding signals, a ringing signal source 18, a transmission resistor 19 for transmitting a ringing signal, and a ring trip detection circuit 20. This ring trip detection circuit 20 includes a current detection part 21, a lowpass filter 22, and a judging part 23 which judges the ring trip.

As described above, the subscriber circuit has the BORSCHT functions, and out of the BORSCHT functions, the R function includes the ringer transmitting function for ringing the subscriber's bell by transmitting a ringing signal and the ring trip function for stopping the ringing if the subscriber OFF-hooks the telephone receiver in response to the ringing of the bell.

Out of the BORSCHT functions, the B and S functions are realized by the battery feed and supervision part 14, the 0 and T functions are realized by the protection test part 12, the R function is realized by the part including the ringing signal source 18, the transmission resistor 19 and the ring trip detection circuit 20, the C function is realized by the codec 16, and the H function is realized by the switching part 15.

In FIG. 1, the relay 13 is ON and connected to the ringing signal source 18 during the ringing. Hence, the ringing signal from the ringing signal source 18 is transmitted to the telephone set 11 via the transmission resistor 19. In this state, it is possible to measure a transmitting current with respect to the telephone set 11 by detecting a voltage across the two terminals of the transmission resistor 19. The transmitting current is made up of only an A.C. component which flows through a capacitor within the telephone set 11 in a state where the bell is ringing but the subscriber does not OFF-hook the telephone receiver. On the other hand, the transmitting current also includes a D.C. component which flows through a speaking circuit in a state where the subscriber has OFF-hooked the telephone receiver. Accordingly, in this latter case, the D.C. current from a $-48$ V power source of the switching system and an A.C. current from the ringing signal source 18 are superimposed and flow through the transmission resistor 19, and the A.C. current increases in this case.

The ring trip detection circuit 20 detects that the subscriber has OFF-hooked the telephone receiver by detecting the voltage change across the two terminals of the transmission resistor 19. The current detection part 21 detects the current value of the current flowing through the transmission resistor 19. The lowpass filter 22 decreases the A.C. component from the current detected in the current detection part 21. The judging part 23 judges whether or not the telephone receiver is OFF-hooked based on the magnitude of a sum signal which is made up of an increase of the D.C. component and an increase of the A.C. component. In FIG. 1, a supervision output signal SCN1 is output from the battery feed and supervision part 14, and an off-hook judging signal SCN2 is output from the judging part 23 of the ring trip detection circuit 20. A controller (not shown) turns OFF the relay 13 while the off-hook judging signal SCN2 is generated so as to disconnect the ringing signal source 18, and in this case, the ringing signal to the telephone set 11 is cut off.

FIG. 2 shows an example of the conventional ring trip detection circuit 20. In FIG. 2, those parts which are the same as those corresponding parts in FIG. 1 are designated by the same reference numerals, and a description thereof will be omitted.

In FIG. 2, the current detection part 21 is made up of a differential amplifier circuit using an operational amplifier. The current detection part 21 includes an operational amplifier 24, and resistors Rs and Rf which determine the amplitude of the differential amplifier circuit. The lowpass filter 22 includes a resistor Ra and a capacitor Ca. The judging part 23 includes a comparator 25 which compares an output voltage of the lowpass filter 22 with a threshold voltage Vth. The comparator 25 outputs the off-hook judging signal when the output voltage of the lowpass filter 22 exceeds the threshold voltage Vth.

It is desirable for safety reasons to provide the ring trip detection circuit 20 at a part on the side of the telephone set 11 of the ringing signal source 18, and the transmission resistor 19 is inserted at this part. Accordingly, the voltage across the two terminals of the transmission resistor 19 on the side of the ringing signal source 18 is the voltage of the ringing signal source 18 itself, that is, an A.C. voltage of 70 to 100 V which has a frequency of 16 to 20 Hz and is superimposed on the $-48$ V voltage from the $-48$ V power source of the switching system. But on the side of the telephone set 11, the corresponding voltage is reduced by a voltage drop at the transmission resistor 19. A voltage corresponding to this voltage drop is required in the current detection part 21, and the differential amplifier circuit is used to detect the voltage corresponding to this voltage drop.

FIG. 3 shows an example of the circuit construction of the conventional operational amplifier 24. The operational amplifier 24 includes transistors Q11 through Q23, constant current sources IC1 through IC4, diodes D1 through D3, a resistor R and a capacitor C1 which are connected as shown.

In FIG. 3, the transistors Q11 through Q14 form a differential amplifier, and emitters of the transistors Q13 and Q14 are connected to a current mirror circuit which is made up of the transistors Q15 and Q16 and form an active load. Hence, if an input +IN increases, for example, a current flows in a direction i from a collector of the transistor Q14.

The transistors Q17 through Q19 form three stages of amplifiers and amplify the change in the input so as to generate an output at a collector of the transistor Q19. As a result, an output is obtained via an emitter-follower circuit which is made up of the transistors Q21 and Q22.

As may be seen from FIG. 3, the operational amplifier 24 is made up of a large number of transistors. In addition, each constant current source is formed by several transistors. Hence, there is a problem in that the number of parts forming the operational amplifier 24 is large. In addition, because the operational amplifier 24 as a whole has an extremely high gain, a negative feedback is normally provided when in use, but the capacitor C1 for phase compensation is essential in order to prevent oscillation and ensure stable operation. However, this capacitor occupies a large area when the operational amplifier 24 is made in the form of a large scale integrated circuit (LSI), and there is a problem in that the provision of the capacitor C1 prevents the size of the LSI from being further reduced.

Therefore, although the current detection part 21 of the conventional ring trip detection circuit 20 detects the current by use of the operational amplifier 24, the number of parts becomes large if this ring trip detection circuit 20 is simply made in the form of an LSI. Furthermore, because the operational amplifier 24 requires the capacitor C1 for phase compensation, a large mounting area is occupied by the capacitor C1 and it is not only difficult to reduce the size of the LSI but also difficult to reduce the cost of the ring trip detection circuit 20.

SUMMARY OF THE INVENTION

Accordingly, it is a general object of the present invention to provide a novel and useful ring trip detection circuit in which the problems described above are eliminated.

Another and more specific object of the present invention is to provide a ring trip detection circuit for detecting an OFF-hooked state of a telephone receiver during ringing of a telephone set by detecting a change in a voltage across two terminals of a transmission resistor through which a ringing signal is supplied to the telephone set from a ringing signal source, comprising a voltage dividing circuit, coupled to the two terminals of the transmission resistor, for dividing voltages at the two terminals and for outputting divided voltages, a first pair of transistors having bases for respectively receiving the divided voltages from the voltage dividing circuit, a constant current source, a first pair of resistors having first terminals respectively coupled to emitters of the first pair of transistors and second terminals coupled in common to the constant current source, where the first pair of resistors have the same resistance, and a current mirror circuit, coupled to collectors of the first pair of transistors, for outputting an output current which indicates whether or not the telephone receiver is OFF-hooked. According to the ring trip detection circuit of the present invention, it is possible to form the circuit using an extremely small number of parts. Hence, the ring trip detection circuit according to the present invention is inexpensive and suited for production in the form of an LSI because of the reduced size and simple construction of the circuit.

Still another object of the present invention is to provide the ring trip detection circuit described above and further comprising a second pair of transistors, coupled between the first pair of transistors and the current mirror circuit, for suppressing changes in collector voltages of the transistors forming the first pair of transistors and the current mirror circuit. According to the ring trip detection circuit of the present invention, it is possible to reduce an error in the judgement which is made based on the output current of the current mirror circuit.

Other objects and further features of the present invention will be apparent from the following detailed description when read in conjunction with the accompanying drawings.

DESCRIPTION OF THE PREFERRED EMBODIMENTS

Figure 1:
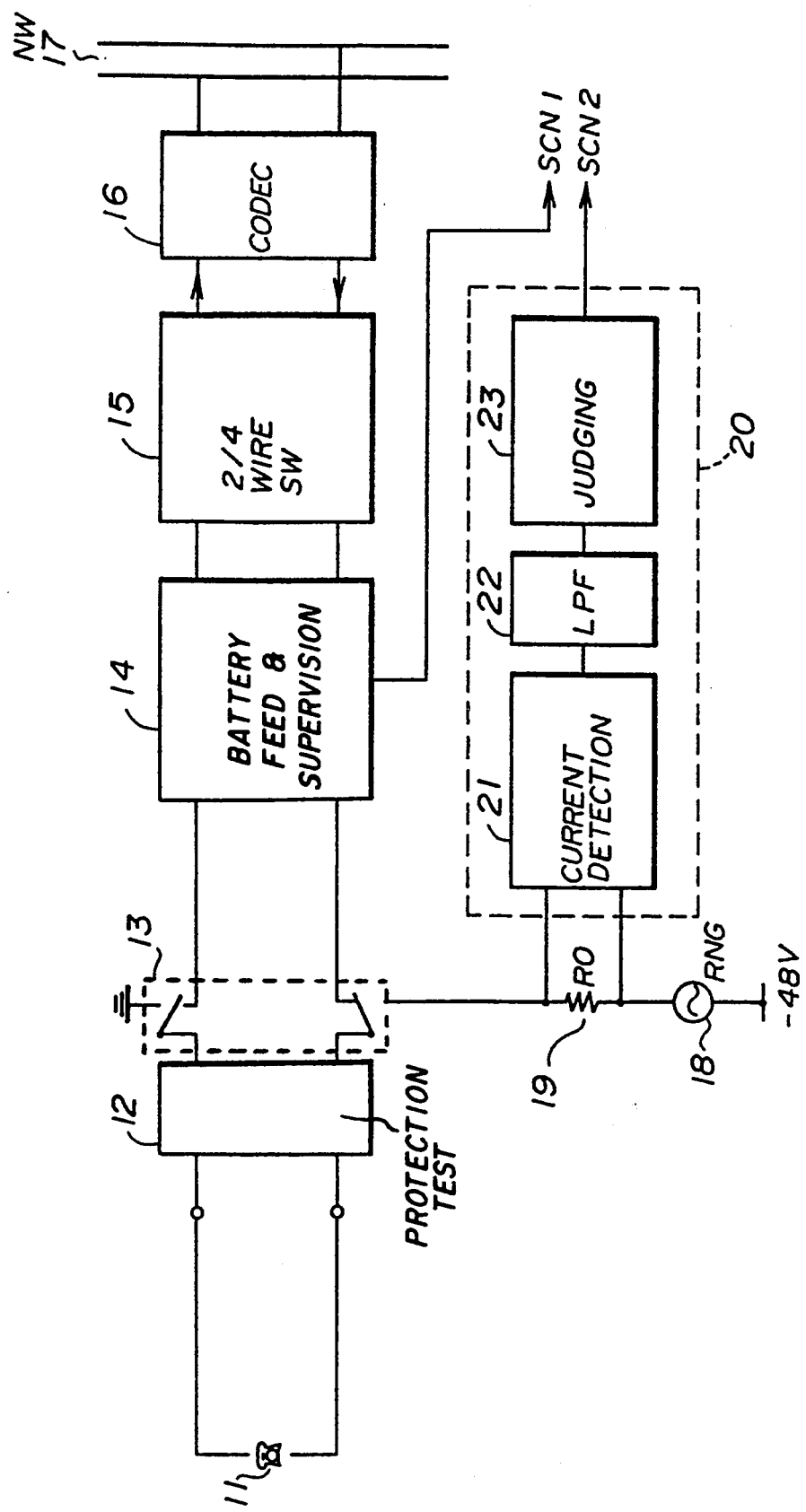
FIG. 1 is a system block diagram showing an example of a general subscriber circuit.
Figure 4:
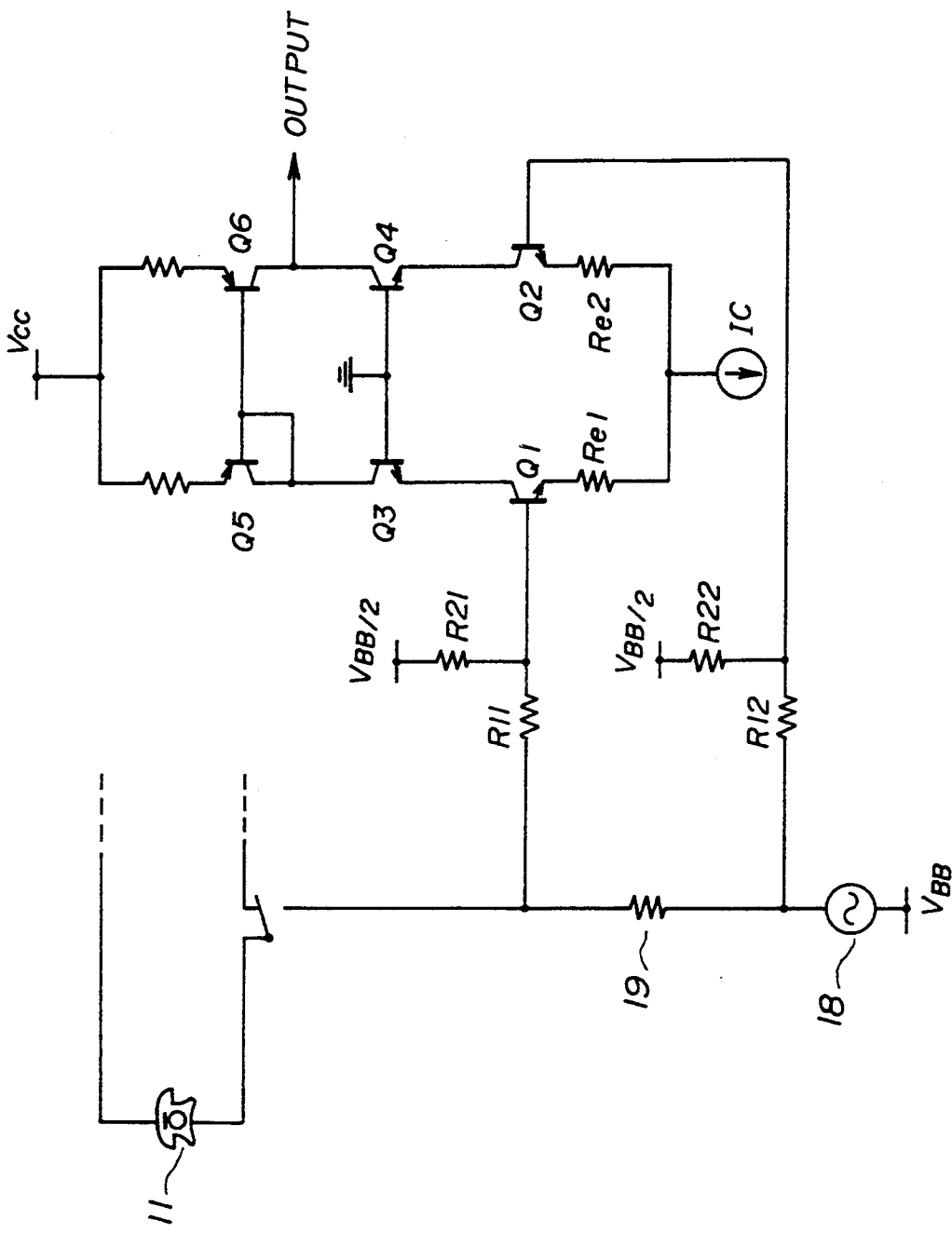
FIG. 4 is a circuit diagram for explaining the operating principle of the present invention.

First, a description will be given of the operating principle of the present invention, by referring to FIG. 4. In FIG. 4, those parts which are the same as those corresponding parts in FIG. 1 are designated by the same reference numerals, and a description thereof will be omitted.

The ring trip detection circuit judges whether or not the telephone receiver is OFF-hooked during the ringing by detecting the voltage across the two terminals of the transmission resistor 19 which supplies the ringing signal from the ringing signal source 18 to the telephone set 11, because the voltage across the terminals of the transmission resistor 19 changes if the telephone receiver is OFF-hooked during the ringing. If it is judged that the telephone receiver is OFF-hooked, the ringing signal source 18 is disconnected from the telephone set 11.

The ring trip detection circuit includes resistors R11, R12, R21, R22, Re1 and Re2, transistors Q1 through Q6, and a constant current source IC which are connected as shown in FIG. 4. Two pairs of voltage dividing resistors R11 and R21, and R12 and R22, are respectively connected to the two terminals of the transmission resistor 19. The divided voltage from the pair of voltage dividing resistors R11 and R21 is input to a base of the transistor Q1, and the divided voltage from the pair of voltage dividing resistors R12 and R22 is input to a base of the transistor Q2, so as to convert the divided voltages into corresponding currents. First terminals of the resistors Re1 and Re2 are respectively connected to emitters of the transistors Q1 and Q2, and have the same resistance. The constant current source IC is connected in common to second terminals of the resistors Re1 and Re2. The transistors Q5 and Q6 form a current mirror circuit which is connected to collectors of the transistors Q1 and Q2. Hence, the difference between the two currents corresponding to the divided voltages is output using the current mirror circuit. The OFF-hooked state of the telephone receiver is judged based on an output current of this current mirror circuit because this output current changes when the telephone receiver is OFF-hooked during the ringing.

A second transistor pair formed by the transistors Q3 and Q4 may be connected between a first transistor pair which is formed by the transistors Q1 and Q2 and the current mirror circuit which is formed by the transistors Q5 and Q6. Bases of the transistors Q3 and Q4 are grounded or connected to a constant voltage. Emitters of the transistors Q3 and Q4 are respectively connected to collectors of the transistors Q1 and Q2, and collectors of the transistors Q3 and Q4 are connected to the transistors Q5 and Q6.

When the transistors Q3 and Q4 are provided, it is possible to suppress the changes in the collector voltages of the transistors Q1 and Q2 and the transistors Q5 and Q6. Accordingly, it is possible to reduce an error in the judgement, that is, the output current of the current mirror circuit, caused by a change in the Hfe of each transistor based on the change in the collector voltage.

The Hfe of the transistor is usually increased by increasing the collector-to-emitter voltage thereof. This effect is called "early effect". The early effect will be a problem of the transistors Q5 and Q6 which form the current mirror circuit. The collector-to-emitter voltage of the transistor Q5 is approximately 0.7 V which is the same as the base-to-emitter voltage of the transistor Q5. On the other hand, the collector-to-emitter voltage of the transistor Q6 can be more than 20 V if there is no transistor Q4. This voltage difference is caused by the difference between the Hfe of the transistors Q5 and Q6. By providing the transistor Q4, the collector-to-emitter voltage of the transistor Q6 becomes less than the power source voltage Vcc which is 5 V. Typically, the collector of the transistor Q6 is connected to a voltage of Vcc/2, and thus, the collector-to-emitter voltage of the transistor Q6 is approximately 2.0 V. Therefore, the early effect is reduced to 1/10.

Figure 2:
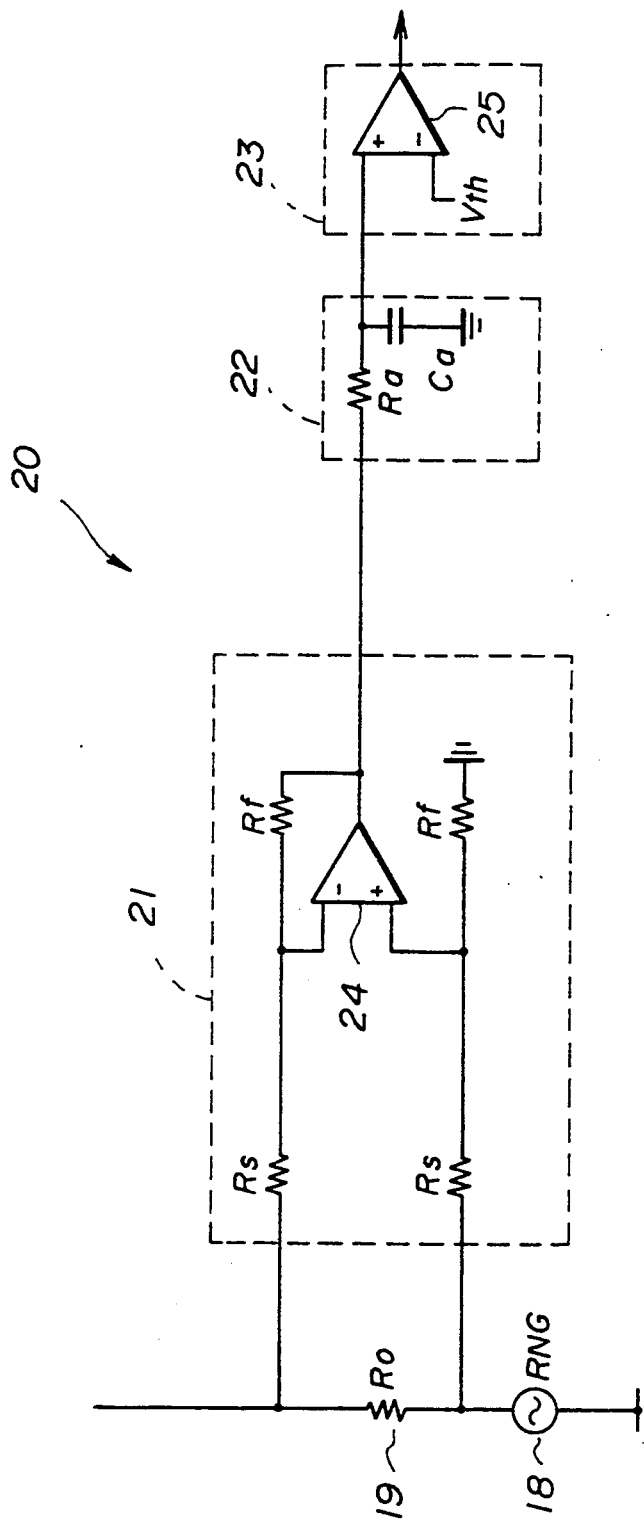
FIG. 2 is a circuit diagram showing an example of a conventional ring trip detection circuit.
Figure 3:
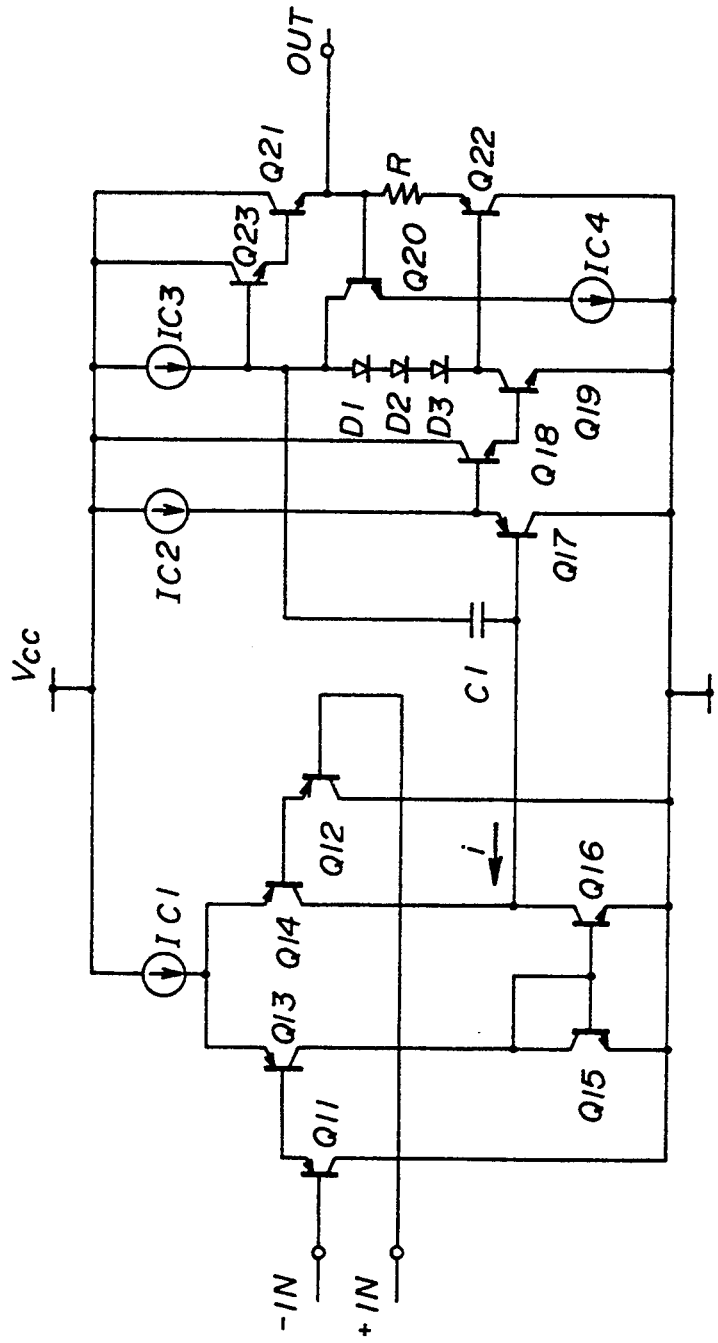
FIG. 3 is a circuit diagram showing an example of the circuit construction of the conventional operational amplifier which is used in a current detection part shown in FIG. 2.
Figure 5:
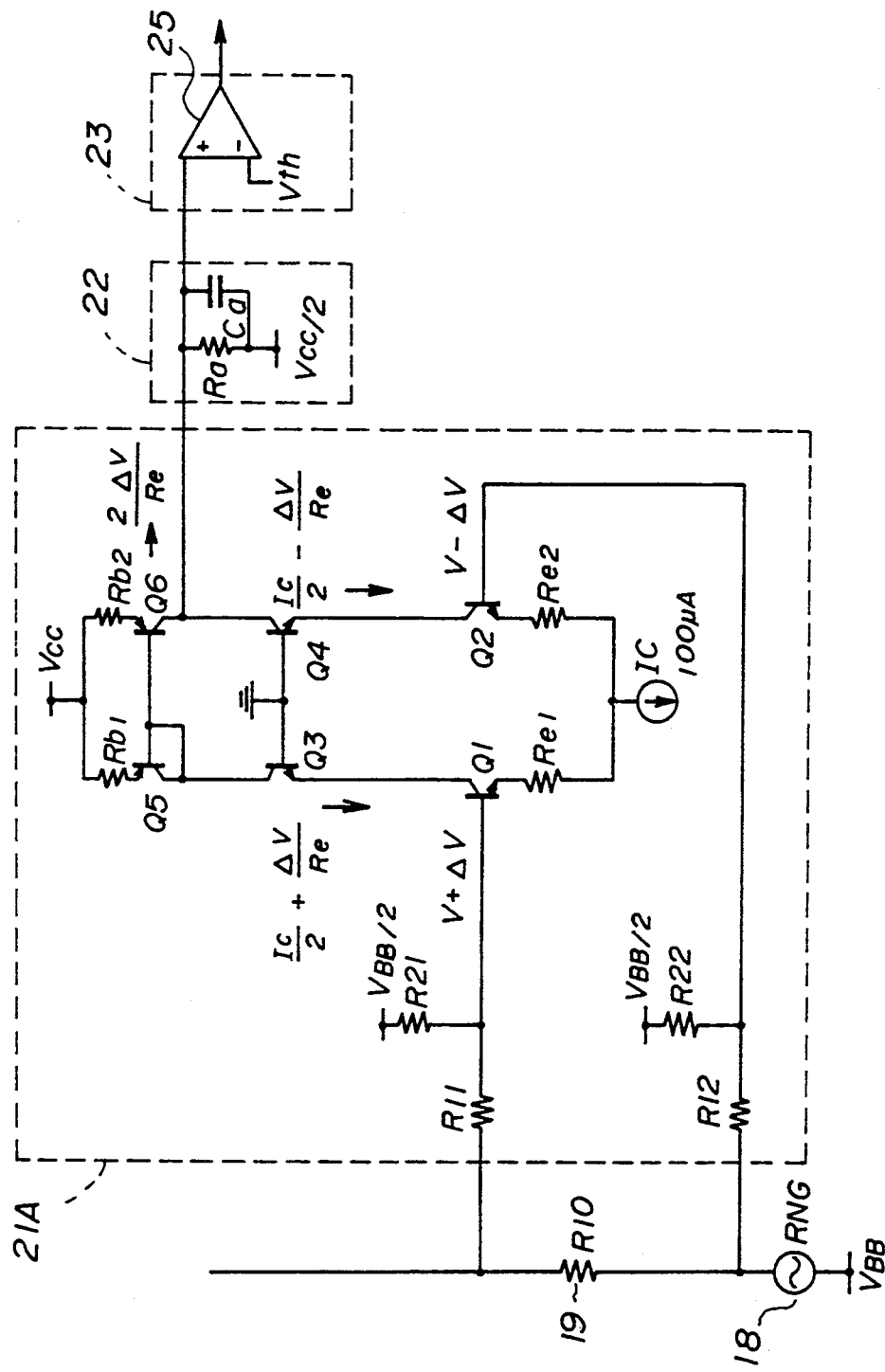
FIG. 5 is a circuit diagram showing an embodiment of a ring trip detection circuit according to the present invention.

Next, a description will be given of an embodiment of the ring trip detection circuit according to the present invention, by referring to FIG. 5. In FIG. 5, those parts which are the same as those corresponding parts in FIGS. 2 and 4 are designated by the same reference numerals, and a description thereof will be omitted.

In FIG. 5, a current detection part 21A includes transistors Q1 through Q6, a constant current source IC, and resistors R11, R12, R21, R22, Rb1, Rb2, Re1 and Re2 which are connected as shown. The resistors Rb1 and Rb2 have the same resistance, and the resistors Re1 and Re2 have the same resistance.

The transmission resistor 19 shown in FIG. 5 is formed by a resistor R10 having a low resistance. On the other hand, the resistors R11, R12, R21 and R22 have high resistances. The pair of resistors R11 and R21 and the pair of resistors R12 and R22 form two voltage dividing circuits having the same voltage dividing ratio, and respectively detect the voltages at the two terminals of the transmission resistor 19 by reducing these voltages by 1/10, for example. The ends of the resistors R21 and R22 which are not connected to the resistors R11 and R12 are respectively connected to a voltage $V_{BB}/2$, where $V_{BB}$ denotes the power source voltage of the switching system. Normally, the power source voltage $V_{BB}$ is $-48$ V. Hence, the voltages are detected with reference to this voltage $V_{BB}/2$, that is by taking this voltage $V_{BB}/2$ as the center voltage.

The divided voltage from the voltage dividing circuit which is formed by the resistors R11 and R21 is input to the base of the transistor Q1. On the other hand, the divided voltage from the voltage dividing circuit which is formed by the resistors R21 and R22 is input to the base of the transistor Q2. The emitters of the transistors Q1 and Q2 are respectively coupled to a biasing constant current source IC via the resistors Re1 and Re2 which have the same resistance. In addition, the voltage drop across the terminals of each of the resistors Re1 and Re2 is selected to a value which is sufficiently large compared to a base-emitter voltage $V_{be}$ of each of the transistors Q1 and Q2.

Suppose that potentials $V+\Delta V$ and $V-\Delta V$ are respectively introduced at the bases of the transistors Q1 and Q2 based on the A.C. current flowing through the transmission resistor 19, where V denotes the center voltage. In this case, the potential differences (A.C. components) respectively are $+\Delta V$ and $-\Delta V$. Because the base-emitter voltages $V_{be}$ of the transistors Q1 and Q2 are approximately the same, the potential differences are respectively applied to the resistors Re1 and Re2. As a result, currents described by the following relations (1) and (2) respectively flow through the resistors Re1 and Re2, where Re denotes the resistances of the resistors Re1 and Re2 (that is, Re1=Re2=Re) and Ic denotes the current supplied from the constant current source IC.

$$Ic/2 + \Delta V/Re \qquad (1)$$

$$Ic/2 - \Delta V/Re \qquad (2)$$

The transistors Q3 and Q4 have the function of relaying the currents from the transistors Q1 and Q2. The currents from the transistors Q3 and Q4 are input to a 1:1 current mirror circuit which is formed by the transistors Q5 and Q6 and the resistors Rb1 and Rb2 which have the same resistance. The resistors Rb1 and Rb2 have the effect of improving the characteristic of the current mirror circuit which is formed by the transistors Q5 and Q6, that is, increasing the output impedance. This current mirror circuit is equivalent to what is often referred to as the active load in designing the operational amplifier. The current which is described by the relation (1) and has passed through the transistor Q3, is inverted in the current mirror circuit and the direction of the current flow is reversed and output from the transistor Q6. On the other hand, the current which is described by the relation (2) flows through the transistor Q4, and a current corresponding to the difference between the currents of the transistors Q6 and Q4 flows to the lowpass filter 22. The output of the current detection part 21A can be described by $2\Delta V/Re$. In this case, the current flows from the transistor Q6 if $\Delta V$ is positive and the current flows from the transistor Q4 if $\Delta V$ is negative.

The lowpass filter 22 has the function of suppressing to a certain extent the A.C. component (component of $\Delta V$) of the output from the current detection part 21A.

The input to the current detection part 21A due to the potential difference across the two terminals of the transmission resistor 19 based on the D.C. current which flows when the subscriber OFF-hooks the telephone receiver during the ringing, can be considered similarly to $\Delta V$ described above. However, because $\Delta V$ in this case is the D.C. component, $\Delta V$ will not be suppressed by the lowpass filter 22.

The judging circuit 23 judges whether or not the telephone receiver is OFF-hooked during the ringing and outputs the off-hook judging signal if the telephone receiver is OFF-hooked, based on a comparison of the output of the lowpass filter 22 and the threshold value Vth. More particularly, the judgement of the judging circuit 23 is based on a comparison of the threshold value Vth and the increase of $\Delta V$ of the A.C. component and the change in $\Delta V$ of the D.C. component which occur when the subscriber OFF-hooks the telephone receiver during the ringing.

Therefore, in this embodiment of the ring trip detection circuit, high resistances are coupled to emitters of transistors forming an emitter-coupled circuit, in addition to a circuit which is formed by an operational amplifier, and an idle current of the constant current source IC is supplied to the high resistances so as to form a voltage-current conversion circuit. Hence, according to this embodiment, it is possible to realize an economical ring trip detection circuit having a simple circuit construction and a small number of parts. Furthermore, because the gain of this ring trip detection circuit has a low gain, it is unnecessary to provide a capacitor for phase compensation. As a result, it is possible to reduce the mounting area of the LSI when the ring trip detection circuit is made in the form of the LSI, and the size of the LSI can be reduced effectively.

It is possible to omit the pair of transistors Q3 and Q4 which are provided between the pair of transistors Q1 and Q2 and the current mirror circuit formed by the transistors Q5 and Q6. However, when the transistors Q3 and Q4 are provided, it is possible to suppress the changes in the collector voltages of the transistors Q1 and Q2 and the transistors Q5 and Q6. Accordingly, it is possible to reduce an error in the judgement, that is, the output current of the current mirror circuit, caused by a change in the Hfe of each transistor based on the change in the collector voltage. It is necessary to apply to the bases of the pair of transistors Q3 and Q4 a voltage having a dynamic range which is at least the same as that with respect to the ground side of the lowpass filter 22. For example, when grounding the bases of the transistors Q3 and Q4, the ground side potential of the lowpass filter 22 is desirably set to Vcc/2, where Vcc is normally +5 V. On the other hand, it is necessary to set the base potentials of the transistors Q3 and Q4 to $-$Vcc if the lowpass filter 22 is connected to ground which is not connected to Vcc/2.

Further, the present invention is not limited to these embodiments, but various variations and modifications may be made without departing from the scope of the present invention.

What is claimed is:

1. A ring trip detection circuit for detecting an OFF-hooked state of a telephone receiver during ringing of a telephone set by detecting a change in a voltage across two terminals of a transmission resistor through which a ringing signal is supplied to the telephone set from a ringing signal source, said ring trip detection circuit comprising:

a voltage dividing circuit, coupled to the two terminals of the transmission resistor, for dividing voltages at the two terminals and for outputting divided voltages;

a first pair of transistors having bases for respectively receiving the divided voltages from said voltage dividing circuit;

a constant current source;

a first pair of resistors having first terminals respectively coupled to emitters of said first pair of transistors and second terminals coupled in common to said constant current source, said first pair of resistors having same resistance values; and a current mirror circuit having an input and an output thereof respectively coupled to collectors of the first pair of transistors, for outputting an output current which indicates whether or not the telephone receiver is off-hooked, an output signal of the ring trip detection circuit being derived from a node which connects the output of said current mirror circuit and one of said first pair of transistors, said voltage dividing circuit including a first resistor circuit for dividing the voltage at one of the terminals of the transmission resistor, and a second resistor circuit for dividing the voltage at the other terminal of the transmission resistor, said first and second resistor circuits dividing the voltage with the same voltage dividing ratio, said current mirror circuit including a second pair of transistors having emitters which are coupled to a power source voltage, bases which are connected to each other and collectors which are respectively coupled to the collectors of said first pair of transistors, one of said second pair of transistors having the base and collector thereof connected to each other, the other of said second pair of transistors outputting the output current from the collector thereof.

2. The ring trip detection circuit as claimed in claim 1, wherein said current mirror circuit further includes a second pair of resistors which are respectively coupled between the power source voltage and the emitters of said second pair of transistors, the resistors forming said second pair of resistors having same resistance values and increasing an output impedance of said current mirror circuit.

3. The ring trip detection circuit as claimed in claim 1, wherein currents described by $Ic/2+\Delta V/Re$ and $Ic/2-\Delta V/Re$ respectively flow through said first pair of resistors when the voltages at the two terminals of the transmission resistor are $+\Delta V$ and $-\Delta V$ and voltages $V+\Delta V$ and $V-\Delta V$ are respectively input to the bases of said first pair of transistors, where Ic denotes a current supplied by said constant current source, Re denotes the resistances of said first pair of resistors, and V denotes an arbitrary center voltage.

4. The ring trip detection circuit as claimed in claim 3, wherein the output current of said current mirror circuit is described by $2\Delta V/Re$.

5. The ring trip detection circuit as claimed in claim 1, which further comprises a third pair of transistors, coupled between said first pair of transistors and said current mirror circuit, for suppressing changes in collector voltages of the transistors forming said first pair of transistors and said current mirror circuit.

6. The ring trip detection circuit as claimed in claim 5, wherein said third pair of transistors have emitters respectively coupled to the collectors of said first pair of transistors, collectors coupled to said current mirror circuit, and bases coupled to a predetermined voltage.

7. The ring trip detection circuit as claimed in claim 6, wherein said predetermined voltage is a ground potential.

8. The ring trip detection circuit as claimed in claim 6, which further comprises a lowpass filter, coupled to said current mirror circuit, for filtering the output current of said current mirror circuit.

9. The ring trip detection circuit as claimed in claim 8, wherein a ground side potential of said lowpass filter has an intermediate value between said power source voltage and said ground potential.

10. The ring trip detection circuit as claimed in claim 9, which further comprises a judging circuit, coupled to said lowpass filter, for comparing an output of said lowpass filter with a threshold value and for outputting a judgement signal when the output of said lowpass filter exceeds the threshold value.

11. The ring trip detection circuit as claimed in claim 1, which further comprises a lowpass filter, coupled to said current mirror circuit, for filtering the output current of said current mirror circuit.

12. The ring trip detection circuit as claimed in claim 11, which further comprises a judging circuit, coupled to said lowpass filter, for comparing an output of said lowpass filter with a threshold value and for outputting a judgement signal when the output of said lowpass filter exceeds the threshold value.

* * * * *